United States Patent
Chen

(10) Patent No.: US 11,121,548 B2
(45) Date of Patent: Sep. 14, 2021

(54) MULTI-INPUT VOLTAGE CONVERTER

(71) Applicant: PEGATRON CORPORATION, Taipei (TW)

(72) Inventor: Hao-Ming Chen, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 0 days.

(21) Appl. No.: 16/511,870

(22) Filed: Jul. 15, 2019

(65) Prior Publication Data

US 2020/0099292 A1    Mar. 26, 2020

(30) Foreign Application Priority Data

Sep. 26, 2018   (TW) .................................. 107133822

(51) Int. Cl.

| H02J 1/10 | (2006.01) |
|---|---|
| H02M 3/156 | (2006.01) |
| H02M 3/335 | (2006.01) |
| H02M 1/00 | (2006.01) |

(52) U.S. Cl.
CPC ........... *H02J 1/102* (2013.01); *H02M 1/0083* (2021.05); *H02M 3/156* (2013.01); *H02M 3/33538* (2013.01)

(58) Field of Classification Search
CPC ...................... H02M 3/155–1588; H02J 1/102
See application file for complete search history.

(56) References Cited

U.S. PATENT DOCUMENTS

| 4,055,807 | A | * | 10/1977 | Priniski | .................... H04B 1/48 455/83 |
|---|---|---|---|---|---|
| 6,735,096 | B2 | | 5/2004 | Chang et al. | |
| 8,988,064 | B2 | | 3/2015 | Hakoda et al. | |
| 9,899,929 | B2 | | 2/2018 | Jitaru et al. | |
| 2009/0206804 | A1 | * | 8/2009 | Xu | ....................... H02M 3/1584 323/234 |
| 2015/0123478 | A1 | | 5/2015 | Murano et al. | |
| 2016/0079857 | A1 | * | 3/2016 | Lo Iacono | ............ H02M 3/156 323/271 |
| 2018/0026441 | A1 | * | 1/2018 | Taufik | ..................... H02M 3/04 307/82 |

(Continued)

FOREIGN PATENT DOCUMENTS

| EP | 0919080 A1 | 6/1999 |
|---|---|---|
| EP | 0919080 B1 | 6/2002 |

(Continued)

OTHER PUBLICATIONS

LM5025, LM5026, LM5034 Operation and Benefits of Active-Clamp Forward Power Converters; Power Designer; Dec. 7, 2011; p. 1-p. 10.

*Primary Examiner* — Peter M Novak
(74) *Attorney, Agent, or Firm* — Li & Cai Intellectual Property (USA) Office

(57) ABSTRACT

A multi-input voltage converter includes an output circuit, a first conversion circuit, and a second conversion circuit. The first conversion circuit includes a first voltage receiving module, a first transformer, a first switch. The second conversion circuit includes a second voltage receiving module, a second switch. When the second voltage receiving module receives the second input voltage, the second switch is turned on to operate, and the output circuit outputs the output voltage.

6 Claims, 4 Drawing Sheets

(56) References Cited

U.S. PATENT DOCUMENTS

2018/0026534 A1\* 1/2018 Turcan .................... H02M 1/08
                                                        323/282
2018/0062515 A1\* 3/2018 Jung ..................... H02M 3/156

FOREIGN PATENT DOCUMENTS

| EP | 3188350 A1 | 7/2017 |
|----|------------|--------|
| JP | 3089153 U | 10/2002 |
| JP | 201374633 A | 4/2013 |
| TW | 200836460 A | 9/2008 |
| TW | 201436427 A | 9/2014 |
| TW | I451676 B | 9/2014 |
| TW | 201530976 A | 8/2015 |
| TW | M506411 U | 8/2015 |
| WO | 2010090032 A1 | 8/2010 |

\* cited by examiner

MULTI-INPUT VOLTAGE CONVERTER

CROSS-REFERENCE TO RELATED PATENT APPLICATION

This application claims the benefit of priority to Taiwan Patent Application No. 107133822, filed on Sep. 26, 2018. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a voltage converter, and more particularly to a voltage converter with multiple input voltages.

BACKGROUND OF THE DISCLOSURE

In the field of power electronics, voltage converters with multiple input voltages are common circuit architectures. In traditional circuits, a single transformer is often used with a variety of input voltage windings. As a result, the optimal efficiency is often found only in a specific set of input voltage and output voltage, while the corresponding efficiency of other input voltages will be lower. Another way is to have each of input voltages have its own voltage convertor, but this may cause the circuit architecture to be very large in size and make it difficult for the circuit volume to be reduced.

Therefore, it is an important issue in the industry to provide a multi-input voltage converter with a simple circuit structure and different conversion efficiencies of input voltages at respective optimum efficiency points.

SUMMARY OF THE DISCLOSURE

In response to the above-referenced technical inadequacies, the present disclosure provides a multi-input voltage convertor. The multi-input voltage converter includes an output circuit, a first conversion circuit, and a second conversion circuit. The first conversion circuit includes a first voltage receiving module receiving the first input voltage, a first transformer, the primary side of the first transformer being electrically connected to the first voltage receiving module, and a first switch, the secondary side of the first transformer being electrically connected to the output circuit through the first switch. When the first voltage receiving module receives the first input voltage, the first switch is turned on to operate, and the output voltage is output by the output circuit. The second conversion circuit includes a second voltage receiving module for receiving the second input voltage, and a second switch electrically connected to the second voltage receiving module, wherein the second voltage receiving module is electrically connected to the output circuit through the second switch. When the second voltage receiving module receives the second input voltage, the second switch is turned on to operate, and the output circuit outputs the output voltage.

In one aspect, the present disclosure provides a multi-input voltage converter for receiving a first input voltage or a second input voltage for outputting an output voltage. The multi-input voltage converter includes an output circuit, a first conversion circuit, and a second conversion circuit. The first conversion circuit includes a first voltage receiving module receiving the first input voltage, a first transformer, a primary side of the first transformer being electrically connected to the first voltage receiving module, and a fourth diode component, a secondary side of the first transformer being electrically connected to the output circuit through the fourth diode component. When the first voltage receiving module receives the first input voltage, the output circuit outputs the output voltage. The second conversion circuit includes a second voltage receiving module for receiving the second input voltage, and a fifth switch electrically connected to the second voltage receiving module, wherein the second voltage receiving module is electrically connected to the output circuit through the fifth switch, and wherein, when the second voltage receiving module receives the second input voltage, the fifth switch is turned on to operate, and the output circuit outputs the output voltage.

Therefore, the multi-input voltage converter of the present disclosure combines the structure of the forward-type voltage converter and the step-down voltage converter by a common output circuit structure to achieve a circuit compatible with various input voltages, which simplifies the circuit architecture, and reduces the circuit size and the cost.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
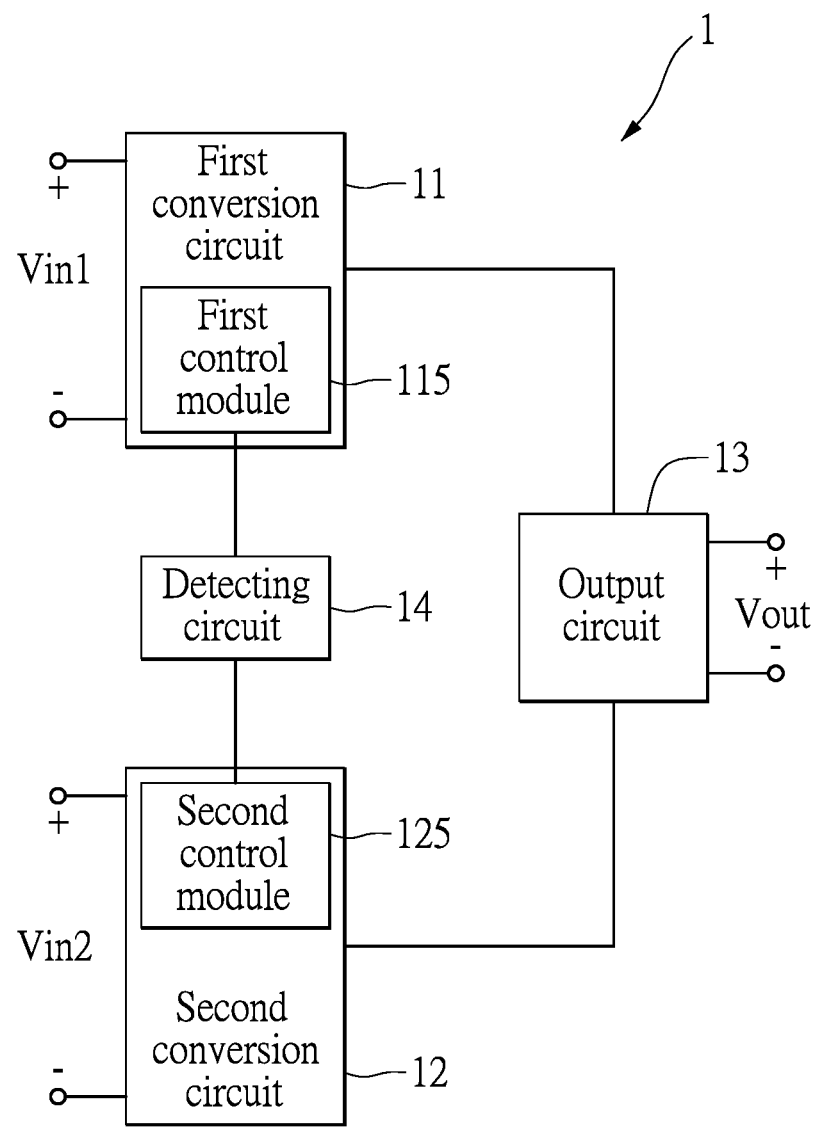
FIG. 1 is a schematic diagram of a multiple input voltage converter in accordance with an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
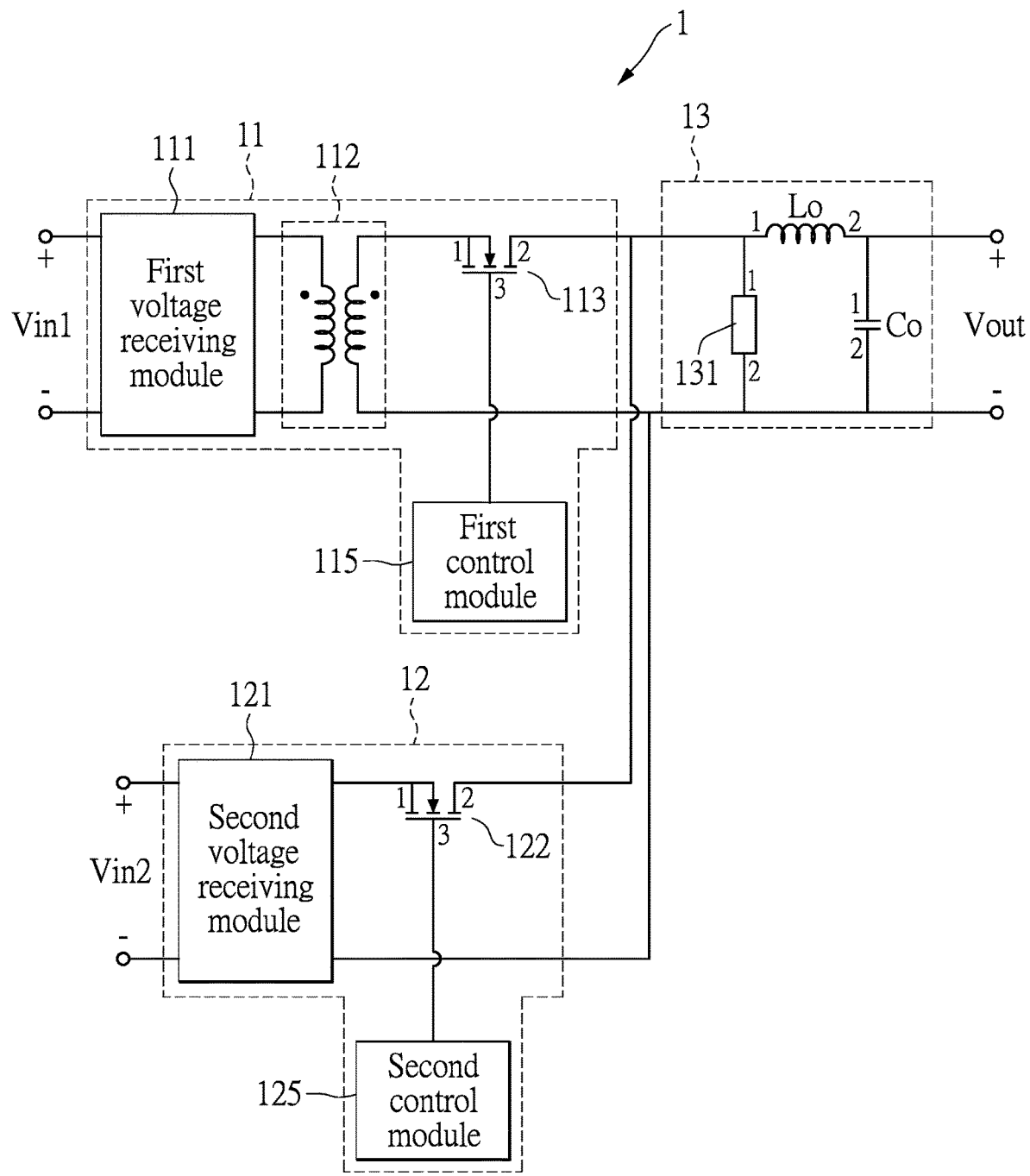
FIG. 2 is a schematic diagram of a multiple input voltage converter in accordance with an embodiment of the present disclosure.
Figure 3:
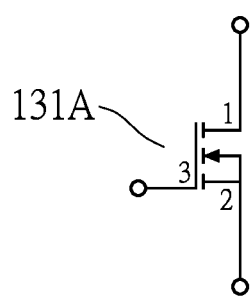
FIG. 3 is a schematic illustration of the conduction element of FIG. 2.

Referring to FIG. 1, FIG. 2, and FIG. 3, FIG. 1 is a schematic diagram of a multiple input voltage converter in accordance with an embodiment of the present disclosure. FIG. 2 is a schematic diagram of a multiple input voltage converter in accordance with an embodiment of the present disclosure. FIG. 3 is a schematic illustration of the conduction element of FIG. 2.

In the present embodiment, the multi-input voltage converter 1 includes a first conversion circuit 11, a second conversion circuit 12, an output circuit 13, and a detection circuit 14.

The first conversion circuit 11 is electrically connected to the output circuit 13 and the detection circuit 14. Similarly, the second conversion circuit 12 is electrically connected to the output circuit 13 and the detection circuit 14.

The first conversion circuit 11 receives a first input voltage Vin1 and converts the first input voltage Vin1 as an output voltage Vout. The second conversion circuit 12 receives a second input voltage Vin 2 and converts the second input voltage Vin 2 as the output voltage Vout.

The first conversion circuit 11 includes a first voltage receiving module 111, a first transformer 112, a first switch 113, and a first control module 115. The first voltage receiving module 111 receives the first input voltage Vin1.

A primary side of the first transformer 112 is electrically connected to the first voltage receiving module 111 for adjusting the voltage of the first input voltage Vin1.

In the embodiment, the first switch 113 includes a first terminal, a second terminal, and a third terminal. The first terminal of the first switch 113 is electrically connected to a secondary side of the first transformer 112. The second terminal of the first switch 113 is electrically connected to the output circuit 13. In other words, the secondary side of the first transformer 112 is electrically connected to the output circuit 13 through the first switch 113. The first control module 115 is electrically connected to the third terminal of the first switch 113 for providing at least one control signal to control a turn-on state or a turn-off state of the first switch 113.

The second conversion circuit 12 includes a second voltage receiving module 121, a second switch 122, and a second control module 125.

The second voltage receiving module 121 is configured to receive the second input voltage Vin2. The second switch 122 includes a first terminal, a second terminal, and a third terminal. The first terminal of the second switch 122 is electrically connected to the second voltage receiving module 121. The second terminal of the second switch 122 is electrically connected to the output circuit 13. The second control module 125 is electrically connected to the third terminal of the second switch 122 for providing at least one control signal to control a turn-on state or a turn-off state of the first switch 122.

In the embodiment, the first voltage receiving module 111 and the second voltage receiving module 121 may include a rectifier and a capacitor, which can be adjusted and designed based on actual requirements, and being not limited in the present disclosure.

In the embodiment, the first control module 115 and the second control module 125 respectively provide a pulse width modulation signal to the first switch 113 and the second switch 122.

The output circuit 13 includes a conduction element 131, an output inductor Lo, and an output capacitor Co.

The first terminal of the conduction element 131 is electrically connected to the second terminal of the first switch 113, the second terminal of the second switch 122, and the first terminal of the output inductor Lo. The second terminal of the conduction element 131 is electrically connected to the secondary side of the first transformer 112 and the second terminal of the output capacitor Co. The first terminal of the output capacitor Co is electrically connected to the second terminal of the output inductor Lo. In the embodiment, the first terminal of the output capacitor Co is a positive terminal, and the second terminal of the output capacitor Co is a negative terminal.

In the present embodiment, the multi-input voltage converter 1 provides the output voltage Vout to a load (not shown) through the first terminal and the second terminal of the output capacitor Co.

In the embodiment, the detection circuit 14 of the multi-input voltage converter 1 is configured to detect that the first voltage receiving module 111 receives the first input voltage Vin1 or the second voltage receiving module 121 receives the second input voltage Vin2. In other words, when the detection circuit 14 detects that the first voltage receiving module 111 of the first converting circuit 11 receives the first input voltage Vin1, the detection circuit 14 transmits a first detecting signal to the first control module 115. The first control module 115 works and the first conversion circuit 11 and the output circuit 13 can cooperate to convert the first input voltage Vin1 as the output voltage Vout. In the embodiment, the first conversion circuit 11 and the output circuit 13 cooperatively form a forward converter.

When the detection circuit 14 detects that the second voltage receiving module 121 of the second converting circuit 12 is electrically connected to the second input voltage Vin2, the detection circuit 14 transmits a second detecting signal to the second control module 125. The second control module 125 is operated to cause the second conversion circuit 12 and the output circuit 13 to cooperate to convert the second input voltage Vin2 into the output voltage Vout. In the present embodiment, the second conversion circuit 12 and the output circuit 13 cooperatively form a buck converter.

Referring to FIG. 3, the conduction element 131 of the output circuit 13 is a switch.

In other words, when the conduction element 131 is the third switch 131A as shown in FIG. 3, and the first voltage receiving module 111 of the first converting circuit 11 receives the first input voltage Vin1.

The first control module 115 controls the first switch 113 and the third switch 131A of the output circuit 13 to cooperatively output the output voltage Vout. In the embodiment, the first control module 115 provides a pulse width modulation signal to each of the first switch 113 and the conduction element 131 (the third switch 131A) to control the turn-on state or the turn-off state of the first switch 113 and the conduction element 131.

In addition, when the conduction element 131 is the third switch 131A shown in FIG. 3, and the second voltage receiving module 121 of the second converting circuit 12 is electrically connected to the second input voltage Vin2, the second control module 125 controls the second switch 122 and the conduction elements 131 of the output circuit 13 (i.e., the third switch 131A) to cooperatively output the output voltage Vout. In the embodiment, the second control module 125 provides a pulse width modulation signal to each of the second switch 122 and the conduction element 131 (the third switch 131A) to control the turn-on state or the turn-off state of the second switch 122 and the conduction element 131.

In the embodiment, the third switch 131A includes a first terminal, a second terminal, and a third terminal. The first terminal of the third switch 131A corresponds to the first terminal of the conduction element 131. The second terminal of the third switch 131A corresponds to the second terminal of the conduction element 131. Furthermore, the first control module 115 and the second control module 125 are electrically connected to the third terminal of the third switch 131A. In other words, the first control module 115 and the second control module 125 each provides a pulse width modulation signal to the third switch 131A to control the turn-on state or the turn-off state of the third switch 131A.

In the embodiment, at least one of the first switch 113, the second switch 122, and the third switch 131A is a Metal-Oxide-Semiconductor Field-Effect Transistor (MOSFET), and at least one of the first switch 113, the second switch 122, and the third switch 131A is an Insulated Gate Bipolar Transistor (IGBT). The specifications of the first switch 113, the second switch 122, and the third switch 131A can be adjusted and designed based on actual requirements, and are not limited in the present disclosure.

In the embodiment, the first input voltage Vin1 and the second input voltage Vin2 are respectively an input voltage of a high voltage interval and an input voltage of a low voltage interval. In other words, the first input voltage Vin1 can be an AC voltage of 220V, an AC voltage of 110V, a DC voltage of 400V, or a DC voltage of 48V, etc., in other words, in a high voltage range. For example, the input voltage is between DC48V and DC100V, or between AC90V~264V.

The second input voltage Vin2 is mainly a lower voltage DC voltage, such as a DC 24V, a DC 12V, a DC 5V, etc. In other words, the second input voltage Vin2 is in a low voltage range, for example, between DC3.3V~DC24V, or DC5V~DC12V, but can be designed based on actual requirements, and is not limited in the present disclosure.

Figure 4:
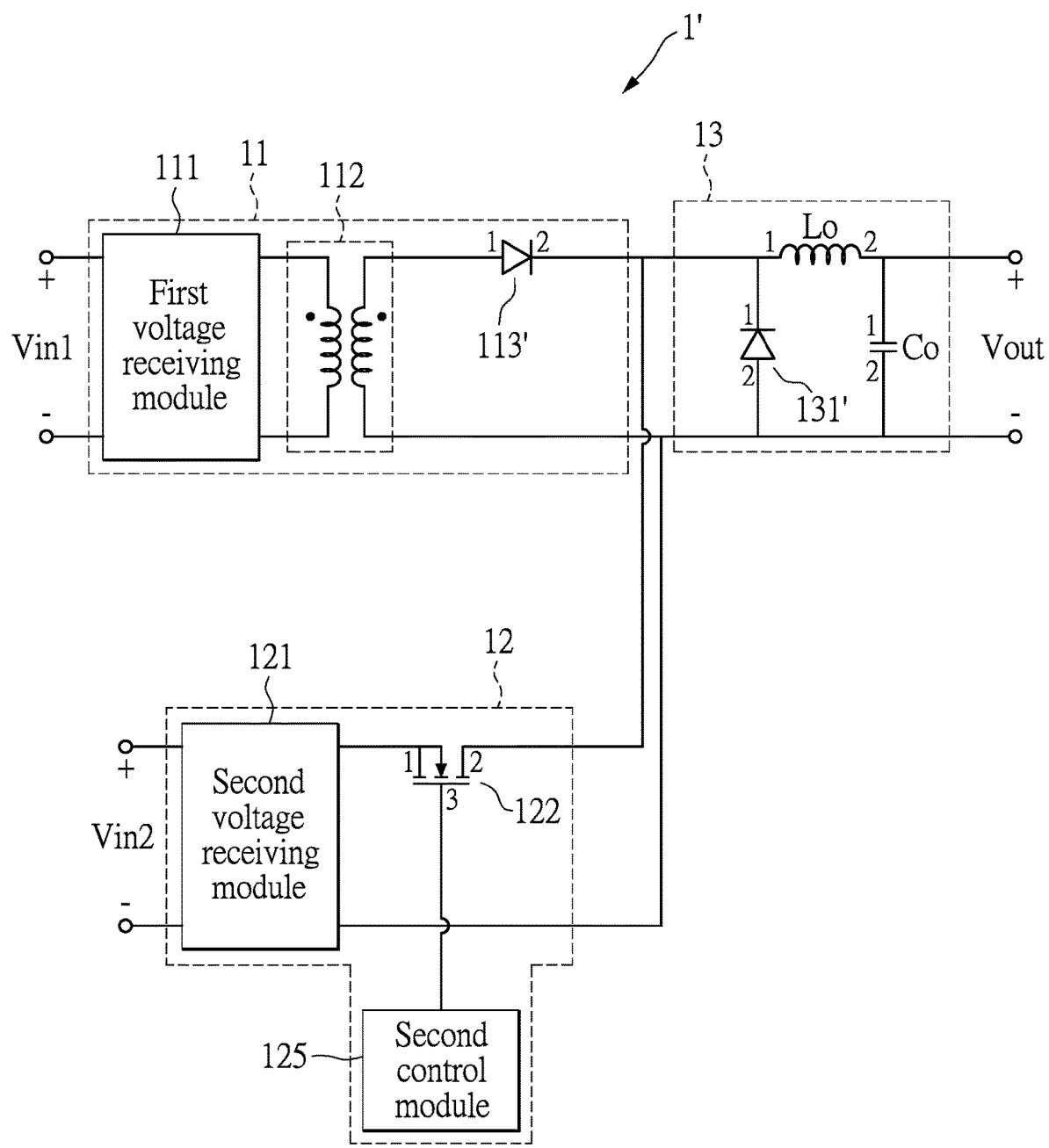
FIG. 4 is a schematic diagram of another multiple input voltage converter in accordance with an embodiment of the present disclosure.

In other embodiments, the first input voltage Vin1 may be an input voltage that is required to meet the high voltage isolation conditions of a relevant safety standard. Since the first conversion circuit 11 includes a first transformer 111, the first input voltage Vin1 is converted by the first transformer 111, which should meet the high voltage isolation conditions of the relevant safety standard. The second input voltage Vin2 may be an input voltage that is not required to meet the high voltage isolation conditions of the relevant safety standard, but can be designed based on actual requirements, and is not limited in the present disclosure Second Embodiment Referring to FIG. 4, FIG. 4 is a schematic diagram of another multiple input voltage converter in accordance with an embodiment of the present disclosure. In the embodiment, the multi-input voltage converter 1' differs from the multi-input voltage converter 1 of the previously described embodiment in that the first conversion circuit 11 of the multi-input voltage converter 1 includes a first switch 113, and the first conversion circuit 11 of the multi-input voltage converter 1' in the embodiment includes a fourth diode element 113'. Furthermore, the output circuit 13 of the multi-input voltage converter 1 includes a conduction element 131, and the conduction element 131 is a switch. In the embodiment, the output circuit 13 includes a sixth diode 131'. Other circuit architectures, operations, and related components are generally similar to those of the first embodiment, and therefore are not described here.

In the embodiment, the first terminal of the fourth diode element 113' is the anode terminal and the second terminal of the fourth diode element 113' is the cathode terminal. The first terminal of the sixth diode element 131' is the cathode terminal, and the second terminal of the sixth diode element 131' is the anode terminal.

In conclusion, the multi-input voltage converter of the present disclosure combines the structure of the forward-type voltage converter and the step-down voltage converter by a common output circuit structure to achieve a circuit compatible with various input voltages, which simplifies the circuit architecture, and reduces the circuit size and the cost.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A multi-input voltage converter for receiving a first input voltage or a second input voltage for outputting an output voltage, the multi-input voltage converter comprising:
    an output circuit at least including a conduction element;
    a first conversion circuit comprising:
        a first voltage receiving module for receiving the first input voltage;
        a first transformer, a primary side of the first transformer being electrically connected to the first voltage receiving module; and
        a first switch, a secondary side of the first transformer being electrically connected to the output circuit through the first switch, wherein when the first voltage receiving module receives the first input voltage, the first switch is turned on to operate, and the output voltage is output by the output circuit; and
    a second conversion circuit comprising:

a second voltage receiving module for receiving the second input voltage; and a second switch electrically connected to the second voltage receiving module, wherein the second voltage receiving module is electrically connected to the output circuit through the second switch, wherein when the second voltage receiving module receives the second input voltage, the second switch is turned on to operate, and the output circuit outputs the output voltage;

wherein the conduction element includes a first terminal and a second terminal, the first terminal of the conduction element is electrically connected to the second terminal of the first switch, and the second terminal of the conduction element is electrically connecting the first transformer;

wherein, when the first voltage receiving module receives the first input voltage, the first switch receives a plurality of pulse width modulation signals and operates with conduction element, and the output circuit outputs the output voltage, and when the first voltage receiving module receives the first input voltage, the second switch of the second conversion circuit does not operate;

wherein, when the second voltage receiving module receives the second input voltage, the second switch receives a plurality of pulse width modulation signals and operates with the conduction element, and the output circuit outputs the output voltage, and when the second voltage receiving module receives the second input voltage, the first switch of the first conversion circuit does not operate;

wherein the first conversion circuit further comprises: a first control module electrically connected to the first switch for controlling a turn-on state or a turn-off state of the first switch, and the second conversion circuit further comprises: a second control module electrically connected to the second switch for controlling a turn-on state or a turn-off state of the second switch;

wherein the conduction element is a third switch, and when the first voltage receiving module receives the first input voltage, the first control module controls the first transformer, the first switch, and the conduction element of the output circuit to output the output voltage;

wherein when the second voltage receiving module receives the second input voltage, the second control module controls the second switch and the conduction element of the output circuit to output the output voltage;

wherein the third switch comprises a first terminal, a second terminal, and a third terminal, the first terminal of the third switch is electrically connected to the second terminal of the first switch, the second terminal of the third switch is electrically connected to the first transformer, the third terminal of the third switch is electrically connected to the first control module and the second control module.

2. The multi-input voltage converter of claim 1, wherein the output circuit comprises:

an output inductor comprising a first terminal and a second terminal, the first terminal of the output inductor being electrically connected to the first terminal of the conduction element and the second terminal of the first switch; and an output capacitor comprising a first terminal and a second terminal, the first terminal of the output capacitor being electrically connected to the second terminal of the output inductor, and the second terminal of the output capacitor being electrically connected to the second terminal of the conduction element and the first transformer.

3. The multi-input voltage converter of claim 1, further comprising:

a detection circuit electrically connected to the first control module and the second control module, detecting that the first voltage receiving module receives the first voltage or the second voltage receiving module receives the second voltage.

4. The multi-input voltage converter of claim 1, wherein the first conversion circuit and the output circuit cooperatively form a forward-type voltage convertor, and the second conversion circuit and the output circuit cooperatively form a step-down voltage convertor.

5. The multi-input voltage converter of claim 1, wherein the first input voltage is defined between a high voltage interval, and the second input voltage is defined between a low voltage interval.

6. The multi-input voltage converter of claim 1, wherein the first control module or the second control module respectively provides a pulse width modulation signal to the third terminal of the third switch to control a turn-on state or a turn-off state of the third switch.

* * * * *